(12) United States Patent
Gorny et al.

(10) Patent No.: US 11,328,730 B2
(45) Date of Patent: May 10, 2022

(54) AUTOMATED AUDIO-TO-TEXT TRANSCRIPTION IN MULTI-DEVICE TELECONFERENCES

(71) Applicant: Nextiva, Inc., Scottsdale, AZ (US)

(72) Inventors: Tomas Gorny, Scottsdale, AZ (US); Jean-Baptiste Martinoli, St Anaclet de Lesard (CA); Tracy Conrad, Scottsdale, AZ (US); Lukas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 10 days.

(21) Appl. No.: 16/861,929

(22) Filed: Apr. 29, 2020

(65) Prior Publication Data
US 2021/0020181 A1  Jan. 21, 2021

Related U.S. Application Data

(60) Provisional application No. 62/876,401, filed on Jul. 19, 2019.

(51) Int. Cl.
*G10L 15/26* (2006.01)
*H04M 3/56* (2006.01)
*G10L 17/00* (2013.01)

(52) U.S. Cl.
CPC .............. *G10L 15/26* (2013.01); *G10L 17/00* (2013.01); *H04M 3/568* (2013.01)

(58) Field of Classification Search
CPC ......... G10L 15/01; G10L 15/07; G10L 15/26; G10L 15/32; G10L 17/00; H04M 3/568; H04M 2203/552; H04M 2201/40; G09B 19/04

USPC ................. 704/201, 207, 231, 235
See application file for complete search history.

(56) References Cited

U.S. PATENT DOCUMENTS

| 8,370,142 B2 | 2/2013 | Frankel et al. |
| 8,560,309 B2 * | 10/2013 | Pance ............ G10L 17/00 704/231 |
| 9,892,095 B2 | 2/2018 | Dow et al. |
| 9,984,674 B2 | 5/2018 | Gildein, II et al. |

(Continued)

OTHER PUBLICATIONS

International Search Report for Application No. PCT/US2020/041149 dated Oct. 1, 2020. 2 Pages.

*Primary Examiner* — Md S Elahee
(74) *Attorney, Agent, or Firm* — Spencer Fane LLP; Steven J. Laureanti

(57) ABSTRACT

A system and method are disclosed for generating a teleconference space for two or more communication devices using a computer coupled with a database and comprising a processor and memory. The computer generates a teleconference space and transmits requests to join the teleconference space to the two or more communication devices. The computer stores in memory identification information, and audiovisual data associated with one or more users, for each of the two or more communication devices. The computer stores audio transcription data, transmitted to the computer by each of the two or more communication devices and associated with one or more communication device users, in the computer memory. The computer merges the audio transcription data from each of the two or more communication devices into a master audio transcript, and transmits the master audio transcript to each of the two or more communication devices.

20 Claims, 5 Drawing Sheets

(56) References Cited

U.S. PATENT DOCUMENTS

| | | | |
|---|---|---|---|
| 10,582,063 B2* | 3/2020 | De Angelis | G10L 15/193 |
| 2011/0066426 A1 | 3/2011 | Lee | |
| 2017/0018203 A1* | 1/2017 | Fisher | G09B 19/04 |
| 2020/0286476 A1* | 9/2020 | Abdulkader | G10L 15/22 |

* cited by examiner

AUTOMATED AUDIO-TO-TEXT TRANSCRIPTION IN MULTI-DEVICE TELECONFERENCES

CROSS-REFERENCE TO RELATED APPLICATIONS

The present disclosure is related to that disclosed in the U.S. Provisional Application No. 62/876,401, filed Jul. 19, 2019, entitled "Automated Audio-to-Text Transcription in Multi-Device Teleconferences." U.S. Provisional Application No. 62/876,401 is assigned to the assignee of the present application. The subject matter disclosed in U.S. Provisional Application No. 62/876,401 is hereby incorporated by reference into the present disclosure as if fully set forth herein. The present invention hereby claims priority under 35 U.S.C. § 119(e) to U.S. Provisional Application No. 62/876,401.

TECHNICAL FIELD

The present disclosure relates generally to electronic teleconference systems and more specifically to systems and methods to generate and transmit audio-to-text transcripts in multiple-device teleconferences automatically.

BACKGROUND

Teleconference systems may utilize communication networks, including but not limited to the internet, to connect communication devices such as computers, tablet computers, and/or smartphones. Teleconference systems may permit communication devices to share visual imagery and audio data associated with a speaking user with other communication devices. However, multi-device and multi-user teleconferences face several challenges in automatically generating and storing transcripts of the teleconference. By way of example and not of limitation, teleconference system may be unable to rectify discrepancies in transcripts generated by separate communication devices, and may also fail to make accessible a master text transcript of the teleconference quickly and easily.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to more detailed descriptions presented below.

In embodiments of the disclosed subject matter, the unique systems and methods described herein make use of an exemplary system and method to automate audio-to-text transcription in multi-device teleconferences. Embodiments of the disclosed subject matter include two or more communication devices, including but not limited to tablet computers or smartphones, and a computer coupled with a database and comprising a processor and memory. The computer generates a teleconference space and transmits requests to join the teleconference space to the two or more communication devices. The computer stores in memory identification information and audiovisual data transmitted by each of the two or more communication devices.

In embodiments of the disclosed subject matter, the computer merges the audio transcription data from each of the two or more communication devices into a master audio transcript. The computer transmits the master audio transcript to each of the two or more communication devices.

These and other features of the disclosed subject matter are described in greater detail below.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
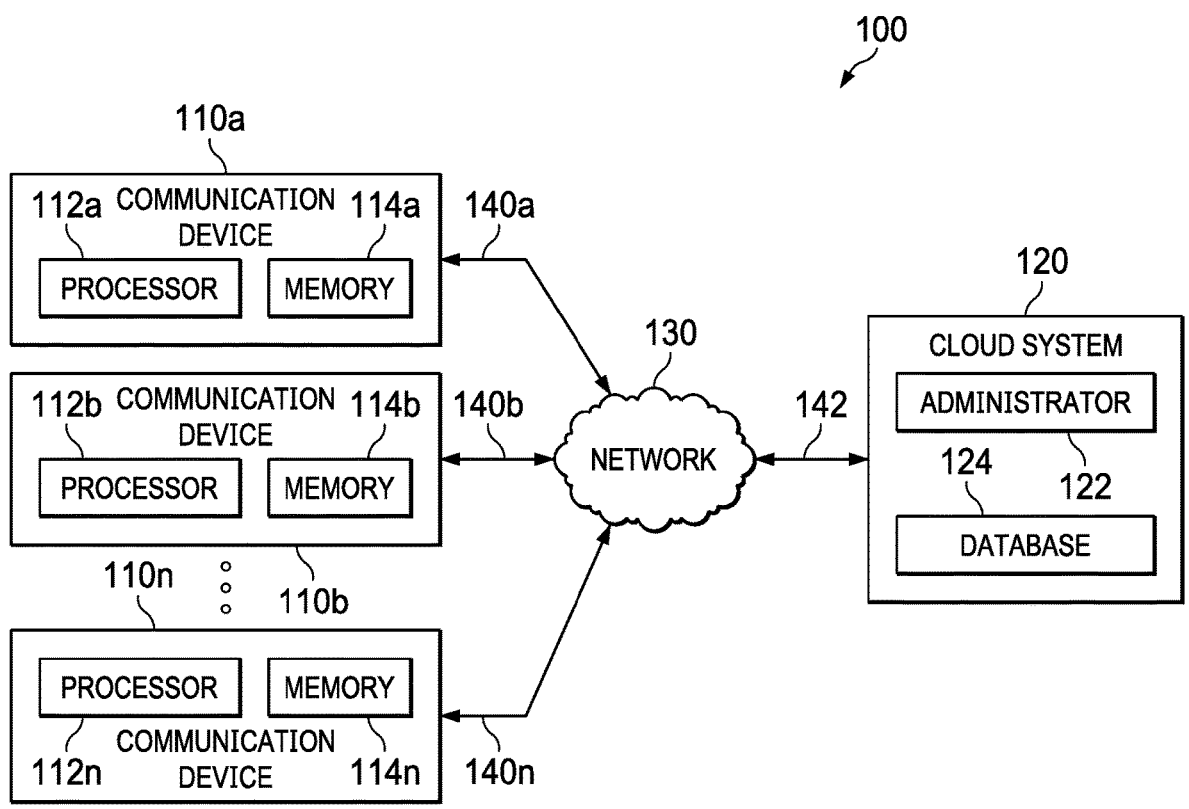
FIG. 1 illustrates an exemplary teleconference system, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, embodiments of the following disclosure relate to a teleconference system and method to create, transmit, merge, and store audio-to-text transcripts in multi-device teleconferences. Embodiments of the following disclosure generate a teleconference space between two or more communication devices, each of which may be operated by an individual or group of users. Each communication device records visual and/or audio data of the one or more users associated with each communication device, and transmits the visual and/or audio data to other communication devices participating in the teleconference space. Each communication device also generates a local text transcript of the audio data of the one or more users associated with each communication device, and transmits the local text transcript to a cloud system. The cloud system merges the local text transcripts from each communication device into a single master text transcript. The cloud system transmits the master text transcript to each communication device.

Embodiments of the following disclosure generate text transcripts of audio and/or audiovisual teleconferences automatically and in real time. Embodiments permit users of communication devices to view the master text transcript in real time as the teleconference progresses. Embodiments store the master text transcript on communication devices and/or the cloud system, and allow communication devices to access the master text transcript after the teleconference concludes. Embodiments provide a consensus mechanism for merging a plurality of local text transcripts, which may comprise differing text transcriptions of the same audio data communications between communication devices, into a single master text transcript.

FIG. 1 illustrates exemplary teleconference system 100, according to a first embodiment. Teleconference system 100 comprises two or more communication devices 110, cloud system 120, network 130, and communication links 140-142. Although communication devices 110a-110n, single cloud system 120, single network 130, and communication links 140-142 are illustrated and described, embodiments contemplate any number of communication devices 110, cloud systems 120, networks 130, or communication links 140-142, according to particular needs.

According to embodiments, each of two or more communication devices 110 comprises processor 112 and memory 114. Processor 112 may execute an operating system program stored in memory 114 to control the overall operation of communication device 110. For example, processor 112 may control the reception of signals and the transmission of signals within teleconference system 100. Processor 112 may execute other processes and programs resident in memory 114, such as, for example, registration, identification or communication over communication links 140-142, and moving data into or out of memory 114, as required by an executing process.

According to embodiments, one or more users may be associated with each of one or more communication devices 110. Each of the one or more users may comprise, for example, an individual person or customer, one or more employees or teams of employees within a business, or any other individual, person, group of persons, business, or enterprise which communicates or otherwise interacts with one or more other communication devices 110. Although an exemplary number of communication devices 110 are shown and described, embodiments contemplate any number of communication devices 110 interacting with network 130 and one or more cloud systems 120 according to particular needs.

Each communication device 110 may comprise, for example, a cellular phone or smartphone, desktop computer, laptop computer, notebook computer, tablet-type device, terminal, or any other communication device 110 capable of receiving, transmitting, and displaying audiovisual information through network 130. In an embodiment, each communication device 110 comprises an audiovisual recording device, such as a camera and microphone, and an audiovisual display, such as an electronic display screen and one or more speakers. Communication device 110 audiovisual recording device may record audiovisual data, comprising visual data and/or audio data, of one or more users associated with communication device 110. Communication device 110 may transmit the audiovisual data to other communication devices 110 participating in the teleconference space, and may receive inbound audiovisual data 218 transmitted by other communication devices 110 participating in the teleconference space, over network 130 and communication links 140-142. Communication device 110 may display this inbound audiovisual data 218 using the audiovisual display, as described in greater detail below.

In one embodiment, cloud system 120 comprises administrator 122 and database 124. Administrator 122 is programmed to merge a plurality of communication device 110 text transcripts, transmitted to administrator 122 by each communication device 110, into a single master text transcript. Database 124 comprises one or more databases 124 or other data storage arrangements at one or more locations local to, or remote from, cloud system 120. In one embodiment, the one or more databases 124 is coupled with administrator 122 using one or more local area networks (LANs), metropolitan area networks (MANs), wide area networks (WANs), or aforementioned network 130, such as, for example, the Internet, or any other appropriate wire line, wireless link, or any other communication links 140-142. One or more databases 124 stores data that is made available to and may be used by administrator 122 according to the operation of teleconference system 100 described below. According to embodiments, administrator 122 hosts and runs one or more runtime processes associated with cloud system 120.

Each of two or more communication devices 110 may be coupled with other communication devices 110, as well as cloud system 120, by network 130 via communication link 140. Although communication links 140a-140n are shown connecting each of communication devices 110a-110n, respectively, to network 130, embodiments contemplate any number of communication links 140-142 connecting any number of communication devices 110 with network 130, according to particular needs. In other embodiments, communication links 140-142 may connect two or more communication devices 110 directly to one another, and/or directly to cloud system 120.

According to embodiments, communication links 140-142 couple communication devices 110, including processor 112 and memory 114 of each communication device 110, and cloud system 120, including administrator 122 and database 124, with network 130. Each communication link may comprise any wireline, wireless, or other link suitable to support data communications between two or more communication devices 110 and/or cloud system 120 and network 130. Although communication links 140-142 are shown as generally coupling two or more communication devices 110 and cloud system 120 with network 130, two or more communication devices 110 and cloud system 120 may communicate directly with each other according to particular needs.

According to embodiments, network 130 includes the Internet, telephone lines, any appropriate LANs, MANs, or WANs, and any other communication network coupling two or more communication devices 110 and cloud system 120. For example, cloud system 120 may maintain data at one or more locations external to cloud system 120, and may make the data available to two or more communication devices 110 using network 130, or in any other appropriate manner.

According to embodiments, two or more communication devices 110 and/or cloud system 120 may each operate on one or more computers that are integral to or separate from the hardware and/or software that supports teleconference system 100. As used herein, the computer, the term "computer," and "computer system" comprise an input device and an output device. The computer input device includes any suitable input device, such as a keypad, mouse, touch screen, microphone, or other device to input information. The computer output device comprises any suitable output device that may convey information associated with the operation of teleconference system 100, including digital or analog data, visual information, or audio information. Furthermore, the one or more computers include any suitable fixed or removable non-transitory computer-readable storage media, such as magnetic computer disks, CD-ROMs, or other suitable media to receive output from and provide input to teleconference system 100. The one or more computers also include one or more processors 112 and associated memory 114 to execute instructions and manipulate information according to the operation of teleconference system 100.

Figure 5:
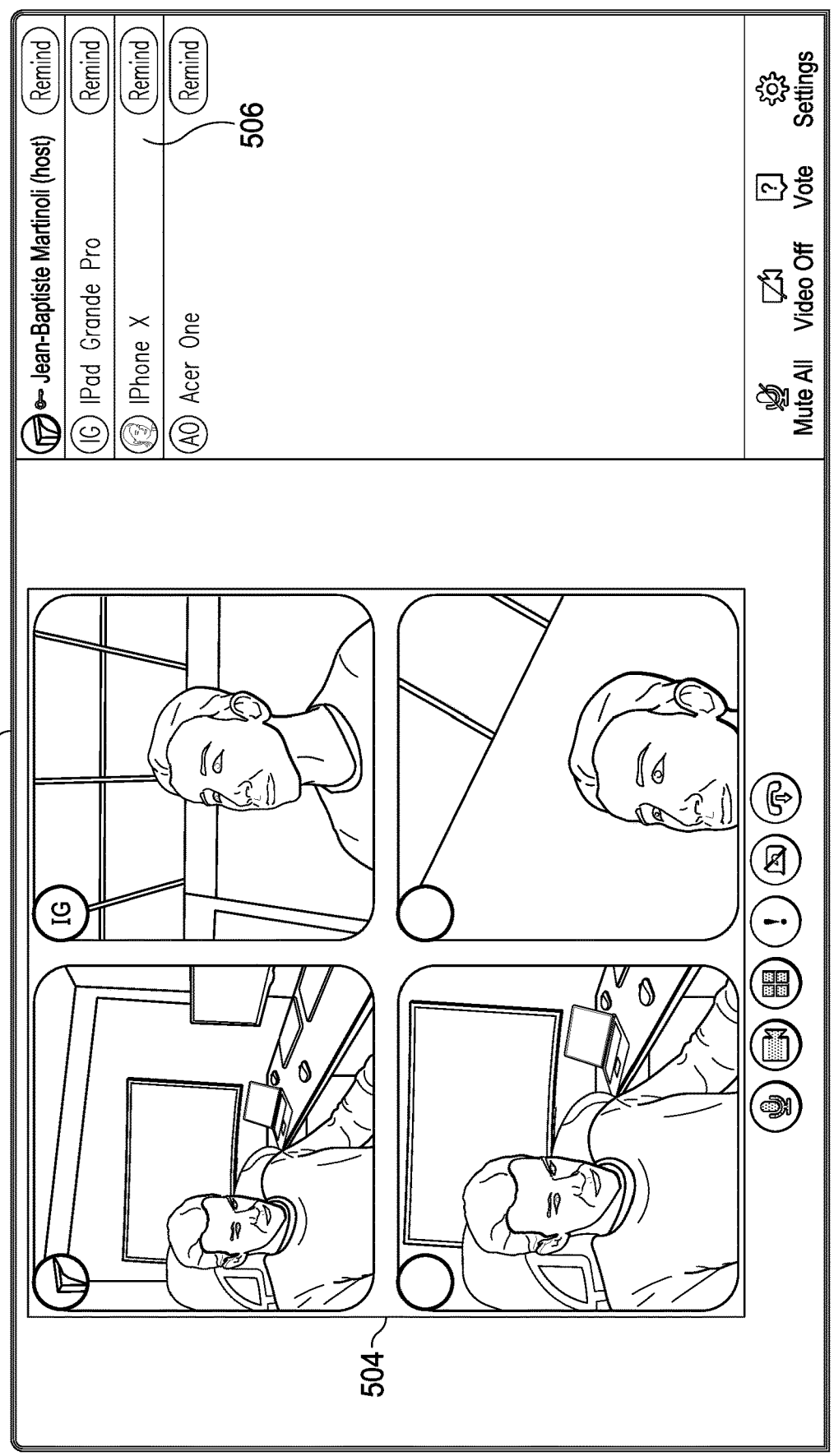
FIG. 5 illustrates a teleconference view, according to an embodiment.

Embodiments contemplate two or more communication devices 110 and cloud system 120 generating a teleconference space. Two or more communication devices 110 may connect to one another, and to cloud system 120, using network 130 and communication links 140-142, to generate and participate in the teleconference space. Each communication device 110 may transmit audiovisual data, comprising visual and/or audio data recorded by each communication device 110's audiovisual recording device, to one or more other communication devices 110 participating in the teleconference space. Each communication device 110 may store, in communication device 110's memory 114, inbound audiovisual data 218 communication device 110 receives from other communication devices 110, and may display inbound audiovisual data 218 from other communication devices 110 on communication device 110's audiovisual display in the form of teleconference view 502, as illustrated in FIG. 5.

According to embodiments, each communication device 110 generates, and stores in communication device 110 memory 114, a local text transcript of the audio data recorded by communication device 110's audiovisual recording device. Each communication device 110 transmits a local text transcript to cloud system 120 using network 130 and communication links 140-142. Cloud system 120 stores the local text transcripts from each communication device 110 participating in the teleconference space in database 124. Cloud system 120 administrator 122 merges the local text transcripts from other communication devices 110 into a single master text transcript, which cloud system 120 stores in database 124. Cloud system 120 administrator 122 transmits the master text transcript to each communication device 110 participating in the teleconference space.

Figure 6:
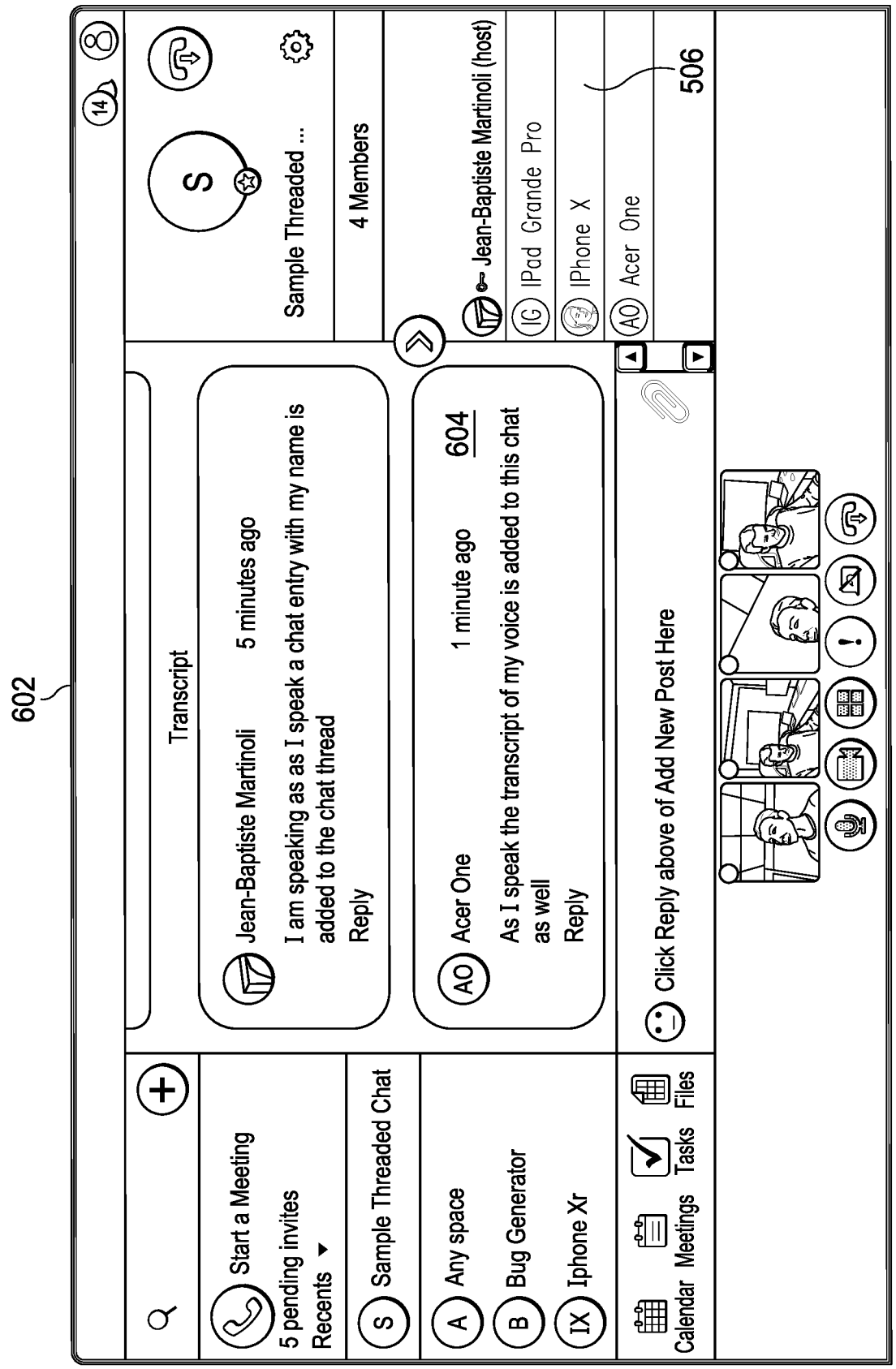
FIG. 6 illustrates a transcript view, according to an embodiment.

Each communication device 110 may store the master text transcript in memory 114 of communication device 110. Each communication device 110 may display the master text transcript on an audiovisual display in the form of transcript view 602, as illustrated in FIG. 6.

Figure 2:
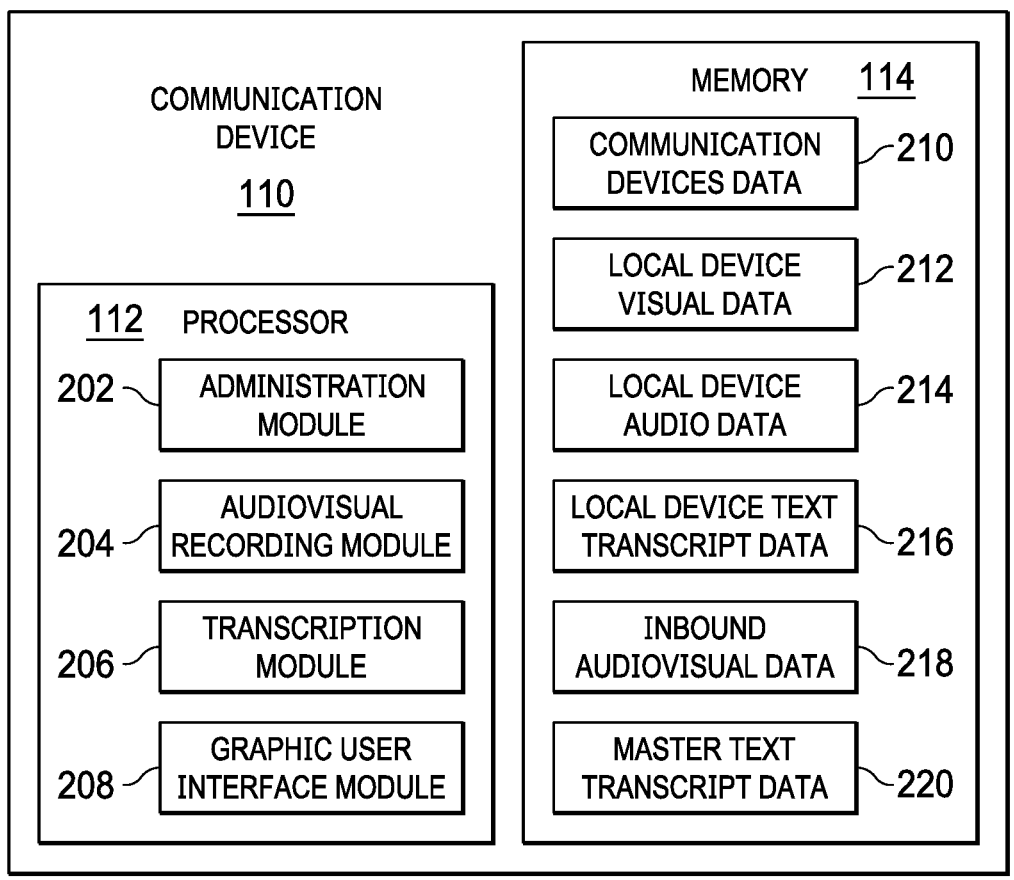
FIG. 2 illustrates an exemplary communication device of FIG. 1 in greater detail, according to an embodiment.

FIG. 2 illustrates exemplary communication device 110 of FIG. 1 in greater detail, according to an embodiment. As described above, communication device 110 may comprise processor 112 and memory 114. Although communication device 110 is described as comprising a single processor 112 and memory 114, embodiments contemplate any suitable number of processors 112, memory 114, or other data storage and retrieval components internal to or externally coupled with communication device 110.

According to embodiments, communication device 110 processor 112 may comprise administration module 202, audiovisual recording module 204, transcription module 206, and graphical user interface module 208. Although processor 112 is described as comprising single administration module 202, audiovisual recording module 204, transcription module 206, and graphical user interface module 208, embodiments contemplate any suitable number of administration modules 202, audiovisual recording modules 204, transcription modules 206, graphical user interface modules 208, and/or other modules, internal to or externally coupled with communication device 110, according to particular needs.

Communication device 110 memory 114 may comprise communication devices data 210, local device visual data 212, local device audio data 214, local device text transcript data 216, inbound audiovisual data 218, and master text transcript data 220. Although memory 114 is described as comprising communication devices data 210, local device visual data 212, local device audio data 214, local device text transcript data 216, inbound audiovisual data 218, and master text transcript data 220, embodiments contemplate any suitable number or combination of communication devices data 210, local device visual data 212, local device audio data 214, local device text transcript data 216, inbound audiovisual data 218, master text transcript data 220, and/or other data, internal to or externally coupled with communication device 110, according to particular needs.

Administration module 202 of processor 112 may configure, update, and/or manage the operation of communication device 110. That is, administration module 202 may configure, update, and/or manage the broader operation of communication device 110 and change which data is executed and/or stored on each communication device 110 and/or cloud system 120. Administration module 202 may comprise a user-configurable system, such that communication device 110 processor 112 may store communication devices data 210, local device visual data 212, local device audio data 214, local device text transcript data 216, inbound audiovisual data 218, and/or master text transcript data 220 either singularly or redundantly in communication device 110 memory 114 and/or cloud system 120 database 124, according to particular needs. According to embodiments, administration module 202 of processor 112 may transmit information to and receive information from other communication devices 110 and/or cloud system 120 participating in the teleconference space, as described in greater detail below.

Administration module 202 may transmit information to and receive information from other communication devices 110 using network 130 and communication links 140-142. Transmitted/received information may comprise local device visual data 212, local device audio data 214, or any other type of data. In an embodiment, administration module 202 may utilize web-based real-time communication (WebRTC) protocols to transmit information to and receive information from administration modules 202 of other communication devices 110 participating in the teleconference space. Upon transmitting information to or receiving information from another communication device 110, administration module 202 may record unique identifying information specific to other communication device 110 in communication devices data 210 of memory 114.

Communication devices data 210 of memory 114 comprises identification information for one or more communication devices 110, such as, for example, names and addresses of the one or more users associated with each of one or more communication devices 110, company contact information, telephone numbers, email addresses, IP addresses, and the like. According to embodiments, communication devices data 210 may also comprise information associated with the operating systems of each of one or more communication devices 110, internet browser information regarding each of one or more communication devices 110, or system specifications (such as, for example, processor 112 speed, available memory 114, hard drive space, and the like) for each of one or more communication devices 110.

Communication devices data 210 may also include end user ID information, communication device 110 ID information, communication device 110 MAC address information, or any other type of information which may identify and track each communication device 110 participating in teleconference system 100. Although particular communication devices data 210 are described, embodiments contemplate any type of communication devices data 210 associated with one or more communication devices 110, according to particular needs.

Audiovisual recording module 204 of processor 112 may be operatively associated with, and may monitor and facilitate the operation of, the audiovisual recording device of communication device 110. By way of an example only and not by way of limitation, audiovisual recording module 204 may activate the audiovisual recording device of communication device 110, and may record audiovisual data, comprising visual data and/or audio data, regarding the one or more users associated with communication device 110. Audiovisual recording module 204 may use the audiovisual recording device to record visual data, such as a video file or real-time visual stream, or one or more individual image snapshots, of one or more users associated with communication device 110. Although particular examples of visual data are described herein, embodiments contemplate audiovisual recording module 204 using the audiovisual recording device of communication device 110 to record any form of visual data, according to particular needs. Audiovisual recording module 204 stores the visual data in local device visual data 212 of memory 114.

Local device visual data 212 of memory 114 stores visual data recorded by audiovisual recording module 204. The visual data may comprise a video file or real-time visual stream saved in any file format, or one or more individual image snapshots saved in any file format, of one or more users associated with communication device 110. Although particular examples of visual data are described, embodiments contemplate audiovisual recording module 204 storing any form of visual data in local device visual data 212, according to particular needs.

Audiovisual recording module 204 may also use communication device 110 audiovisual recording device to record audio data of one or more users associated with communication device 110. The audio data may comprise, for example, a recorded audio file of one or more speaking users. Although particular audio data are described herein, embodiments contemplate audiovisual recording module 204 using the audiovisual recording device of communication device 110 to record any form of audio data, according to particular needs. Audiovisual recording module 204 stores the audio data in local device audio data 214 of memory 114.

Local device audio data 214 of memory 114 stores audio data recorded by audiovisual recording module 204. The audio data may comprise any form of audio data stored in any file format, according to particular needs.

According to embodiments, transcription module 206 accesses local device audio data 214 and transcribes the audio data stored in local device audio data 214 into a local device text transcript. Transcription module 206 may identify one or more speaking users whose voices are recorded in local device audio data 214, and may transcribe their spoken words into a written local device text transcript, which transcription module 206 stores in local device text transcript data 216. Transcription module 206 may use one or more algorithms to parse local device audio data 214 into one or more discrete words, including but not limited to deep learning processes, artificial intelligence (AI) processes, and/or predictive algorithms which estimate the next words in a user's sentence based on the user's previously-spoken words or sentences. Transcription module 206 may use one or more algorithms to separate spoken words in local device audio data 214 from background noises or unintended/unspoken sounds in local device audio data 214. Transcription module 206 may also sort words into punctuated sentences, and may interpret pauses in spoken words as breaks between transcript sentences. In an embodiment, transcription module 206 may update the local device text transcript substantially in real time; in other embodiments, transcription module 206 may update the local device text transcript once every second, once every five seconds, or at any other frequency. Transcription module 206 may analyze the vocal pitch and/or sound frequency of spoken words to associate each word with a particular user associated with communication device 110 (such as, in an embodiment, associating words spoken in a lower pitch with a particular male user, and words spoken in a higher pitch with a particular female user), and may store information associating each word with a particular user in local device text transcript data 216. Transcription module 206 may also associate chronological and/or timestamp information with each word, and may store the chronological and/or timestamp information in local device text transcript data 216.

Local device text transcript data 216 of memory 114 stores the local device text transcript generated by transcription module 206. According to embodiments, transcription module 206 may store the local device text transcript as a plain text file, an encrypted file, or in any other format capable of storing a text file comprising transcribed audio data. Transcription module 206 may also store chronological and/or timestamp information associated with each transcribed word in local device text transcript data 216.

In an embodiment, administration module 202 transmits the visual data stored in local device visual data 212 of communication device 110 memory 114, and/or the audio data stored in local device audio data 214 of communication device 110 memory 114, to each of other communication devices 110 participating in the teleconference space. Similarly, other communication devices 110 participating in the teleconference space transmit visual data and/or audio data from those communication devices 110 to administration module 202. Administration module 202 may associate each of the inbound visual data and/or audio data transmissions with the particular communication device 110 that transmitted the inbound visual and/or audio data transmission, and may store the identification and association information in communication devices data 210 of memory 114. Administration module 202 stores the inbound visual data and/or audio data from other communication devices 110 in inbound audiovisual data 218 of communication device 110 memory 114. In an embodiment, administration module 202 may transmit the visual data and/or the audio data to each of other communication devices 110 substantially in real time; in other embodiments, administration module 202 may transmit the visual data and/or the audio data to each of other communication devices 110 once every second, once every five seconds, or at any other frequency.

Inbound audiovisual data 218 of communication device 110 memory 114 stores the inbound visual data and/or audio data from one or more other communication devices 110 participating in the teleconference space. In an embodiment, inbound audiovisual data 218 stores information associating each particular visual data and/or audio data transmission with communication device 110 that transmitted that particular visual data and/or audio data.

According to embodiments, graphical user interface module 208 of communication device 110 processor 112 generates a graphical user interface display comprising and displaying features of the communication devices data 210, local device visual data 212, local device audio data 214, local device text transcript data 216, inbound audiovisual data 218, and master text transcript data 220. In an embodiment, graphical user interface module 208 accesses local device visual data 212, local device audio data 214, and inbound audiovisual data 218, and generates teleconference view 502, illustrated in FIG. 5. Teleconference view 502 displays visual and/or audio data associated with one or more communication devices 110 participating in the teleconference space, as described in greater detail below. Graphical user interface module 208 may generate different graphical user interface displays conveying different types of information about the teleconference space, teleconference view 502, and transcript view 602, according to embodiments.

According to embodiments, master text transcript data 220 of communication device 110 memory 114 stores data pertaining to the master text transcript. Cloud system 120 generates the master text transcript, and transmits the master text transcript to administration module 202 of communication device 110 using network 130 and communication links 140-142. Administration module 202 stores the master text transcript in master text transcript data 220 of communication device 110 memory 114. According to embodiments, administration module 202 may store the mater text transcript as a plain text file, an encrypted file, or in any other format capable of storing a text file comprising transcribed audio data. In an embodiment, graphical user interface module 208 accesses master text transcript data 220 and generates transcript view 602, illustrated in FIG. 6.

Figure 3:
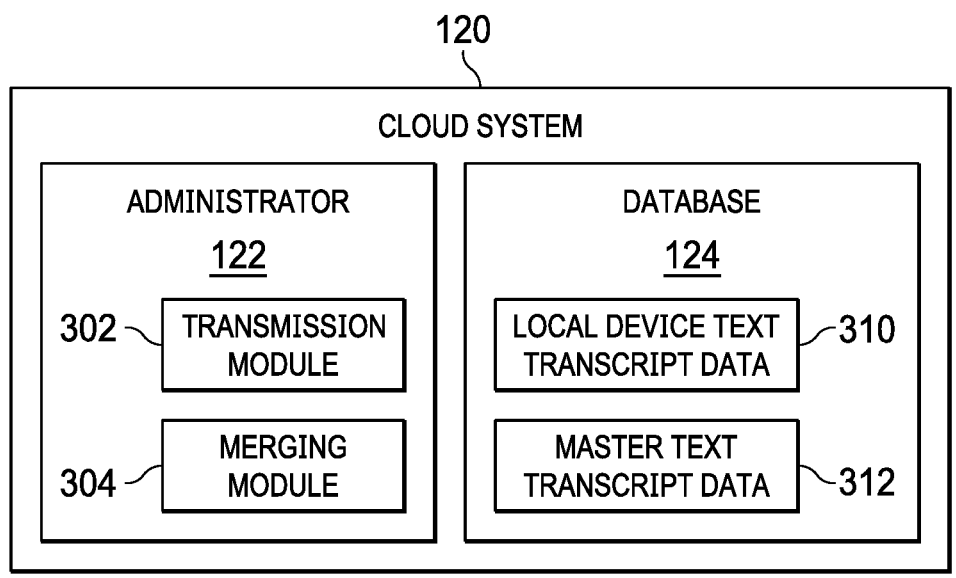
FIG. 3 illustrates the cloud system of FIG. 1 in greater detail, according to an embodiment.

FIG. 3 illustrates cloud system 120 of FIG. 1 in greater detail, according to an embodiment. As discussed above, cloud system 120 may comprise one or more computers at one or more locations including associated input devices, output devices, non-transitory computer-readable storage media, processors 112, memory 114, or other components to send and receive information between one or more communication devices 110 according to the operation of teleconference system 100. In addition, cloud system 120 comprises administrator 122 and database 124. Although cloud system 120 is described as comprising a single administrator 122 and database 124, embodiments contemplate any suitable number of administrators 122 or databases 124 internal to or externally coupled with cloud system 120. In addition, or as an alternative, cloud system 120 may be located internal to one or more communication devices 110. For example, in an embodiment in which one of communication devices 110 is a computer, the computer may also function as cloud system 120 and may generate the teleconference space for other participating communication devices 110. In other embodiments, cloud system 120 may be located external to one or more communication devices 110.

According to embodiments, administrator 122 comprises transmission module 302 and merging module 304. Although a particular configuration of administrator 122 is shown and described, embodiments contemplate any suitable number or combination of transmission modules 302, merging modules 304, and/or other modules, located at one or more locations local to, or remote from cloud system 120, according to particular needs. In addition, or as an alternative, transmission module 302 and merging module 304 may be located on multiple administrators 122 or computers at any location in teleconference system 100.

Database 124 comprises local device text transcript data 310 and master text transcript data 312. Although database 124 is shown and described as comprising local device text transcript data 310 and master text transcript data 312, embodiments contemplate any suitable number or combination of local device text transcript data 310, master text transcript data 312, and/or other data pertaining to teleconference system 100 located at one or more locations, local to, or remote from, cloud system 120, according to particular needs.

According to embodiments, transmission module 302 of cloud system 120 administrator 122 transmits information to, and receives information from, administration modules 202 of each of two or more communication devices 110 participating in the teleconference space. More specifically, each communication device 110 administration module 202 may transmit, to transmission module 302 of cloud system 120, local device text transcript data 216 generated by each particular communication device 110. Transmission module 302 may store each of the other local device text transcripts in local device text transcript data 310 of cloud system 120 database 124.

Local device text transcript data 310 of cloud system 120 may store data pertaining to the local device text transcript of each communication device 110. As described above, each communication device 110 participating in the teleconference space generates a local device text transcript, including chronological and/or timestamp information associated with each transcribed word, and transmits the local device text transcript to transmission module 302 of cloud system 120 administrator 122. Transmission module 302 may also record, in local device text transcript data 310, unique identifying information regarding each communication device 110 that transmitted each of the local device text transcripts.

According to embodiments, merging module 304 of cloud system 120 administrator 122 accesses each of the local device text transcripts stored in local device text transcript data 310. Merging module 304 merges the local device text transcripts into a single master text transcript. Merging module 304 may use the unique identifying information regarding which communication device 110 transmitted each of the local device text transcripts, and/or the chronological and/or timestamp information associated with each transcribed word, to associate one or more users with each local device text transcript, and to assign dialogue text contained in each local device text transcript to one or more communication devices 110 and/or one or more associated users at particular points in time. Merging module 304 may arrange the dialogue text from each communication device 110 local device text transcripts into a single chronological master text transcript comprising all dialogue text from all local device text transcripts. Merging module 304 may update the master text transcript as transmission module 302 stores updated local device text transcripts in local device text transcript data 310 of database 124. In an embodiment, merging module 304 may update the master text transcript substantially in real time; in other embodiments, merging module 304 may update the master text transcript once every second, once every five seconds, or at any other frequency.

According to embodiments, merging module 304 uses one or more consensus mechanisms to rectify discrepancies between the local device text transcripts and to merge the local device text transcripts into a single master text transcript. For example, in an embodiment, merging module 304 may utilize a majority consensus mechanism to merge the local device text transcripts into a single master text transcript. In this example, merging module 304 implementing the majority consensus mechanism preferentially chooses dialogue text present in the majority of local device text transcripts over dialogue text present in only a minority of local device text transcripts. To provide a more specific example of merging module 304 using a majority consensus mechanism, in an embodiment in which merging module 304 accesses three other local device text transcripts stored in local device text transcript data 310, and two of these local device text transcripts contain the sentence "I tied the knot" at a particular chronological point in the transcript whereas the third local device text transcript contains the sentence "I tied the not," at the same chronological point in the transcript, merging module 304 selects "I tied the knot" and not "I tied the not" to include in the master text transcript. Although particular consensus mechanisms are described herein, embodiments contemplate merging module 304 utilizing any consensus mechanism to rectify inconsistencies in the plurality of local device text transcripts, according to particular needs.

According to embodiments, and having generated the master text transcript, merging module 304 stores the master text transcript in master text transcript data 312 of cloud system 120 database 124. Merging module 304 may store the master text transcript as a plain text file, an encrypted file, or in any other format capable of storing a text file.

According to embodiments, transmission module 302 accesses the master text transcript stored in master text transcript data 312. Transmission module 302 transmits the master text transcript to the administration modules 202 of each of two or more communication devices 110 participating in the teleconference space using network 130 and communication links 140-142. Each communication device 110 administration module 202 stores the master text transcript in master text transcript data 220 of communication device 110 memory 114. In an embodiment, transmission module 302 may transmit the master text transcript to each of other communication devices 110 substantially in real time; in other embodiments, transmission module 302 may transmit the master text transcript to each of other communication devices 110 once every second, once every five seconds, or at any other frequency.

Figure 4:
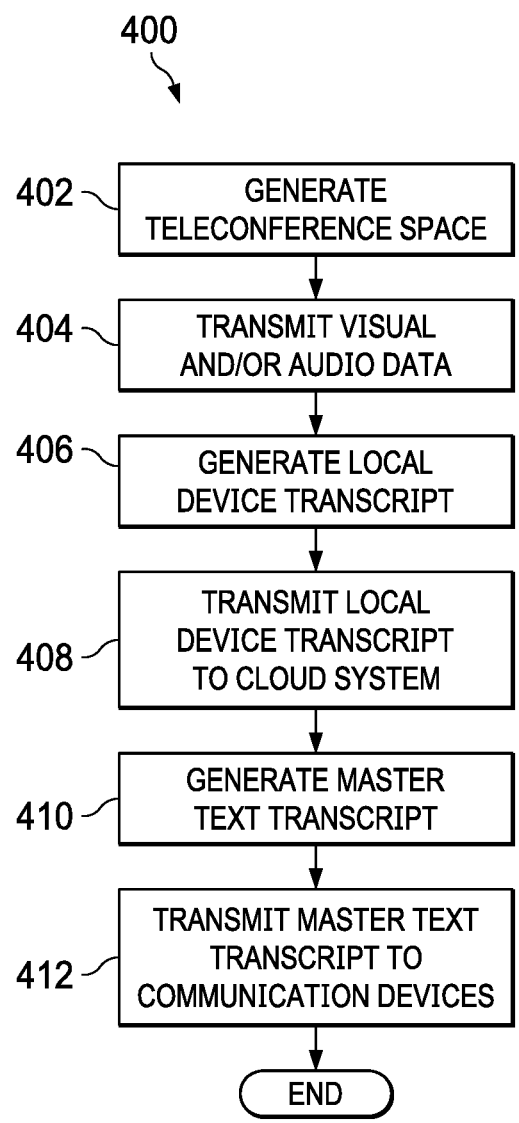
FIG. 4 illustrates an exemplary method of generating an audio-to-text transcript in a teleconference space comprising multiple communication devices, according to an embodiment.

FIG. 4 illustrates exemplary method 400 of generating an audio-to-text transcript in a teleconference space comprising multiple communication devices 110, according to an embodiment. Method 400 of generating an audio-to-text transcript in a teleconference space comprising multiple communication devices 110 proceeds by one or more actions, which although described in a particular order may be performed in one or more permutations or alternative orders, according to particular needs. In an embodiment, the actions may comprise: generating a teleconference space as action 402, transmitting visual and/or audio data as action 404, generating communication device 110 local device text transcripts as action 406, transmitting local device text transcripts to cloud system 120 as action 408, generating a master text transcript as action 410, and transmitting the master text transcript to communication devices 110 as action 412.

At action 402, teleconference system 100 generates a teleconference space. In an embodiment, cloud system 120 administrator 122 transmits requests, using network 130 and communication links 140-142, to one or more communication devices 110 to join the teleconference space. In other embodiments, one or more communication devices transmit requests to cloud system 120 to generate a teleconference space. Administration module 202 of each communication device 110 may store, in communication devices data 210, data that identifies each communication device 110 participating in the teleconference space with a unique communication device 110 ID, and each user associated with each computer with a particular user ID. Communication device 110 administration modules 202 may transmit communication devices data 210 to one or more other communication devices 110 participating in the teleconference space, and/or to cloud system 120. Communication device 110 administration modules 202 may store, in communication devices data 210, communication device 110 ID and user ID data of all other communication devices 110 participating in the teleconference space.

At action 404, each communication device 110 transmits visual data and audio data to one or more other communication devices 110 participating in the teleconference space, and to cloud system 120, using network 130 and communication links 140-142. In other embodiments, each communication device 110 may transmit visual data, audio data, or a combination of visual and audio data, to other communication devices 110 participating in the teleconference space. Audiovisual recording module 204 of each communication device 110 activates communication device 110 audiovisual recording device, and records audiovisual data, comprising visual data and audio data, of the user associated with communication device 110. Audiovisual recording module 204 of each communication device 110 stores the visual data of the associated user in local device visual data 212 of communication device 110 memory 114, and stores the audio data of the associated user in local device audio data 214. Administration module 202 of each communication device 110 accesses the visual data stored in local device visual data 212, and the audio data stored in local device audio data 214, and transmits the visual data and the audio data to one or more other communication devices 110 participating in the teleconference space. Administration module 202 of each communication device 110 receives the inbound visual data and the inbound audio data transmitted by the other communication devices 110 participating in the teleconference space. Administration module 202 of each communication device 110 associates each of the inbound visual data and audio data transmissions with the particular communication device 110 that transmitted each particular visual and audio data transmission, and stores the identification and association information in communication devices data 210 of communication device 110 memory 114. Administration module 202 of each communication device 110 stores the inbound visual data and audio data in inbound audiovisual data 218. In an embodiment, graphical user interface module 208 of each communication device 110 accesses local device visual data 212 of communication device 110, local device audio data 214 of communication device 110, and inbound audiovisual data 218 of communication device 110, and generates teleconference view 502, illustrated by FIG. 5.

At action 406, each communication device 110 generates a local device text transcript of the audio data stored in local device audio data 214 of communication device 110. Transcription module 206 of each communication device 110 accesses local device audio data 214, and transcribes the audio data stored in local device audio data 214 into a local device text transcript. Transcription module 206 of each communication device 110 stores the local device text transcript in local device text transcript data 216 of communication device 110 memory 114.

At action 408, each of communication devices 110 participating in the teleconference space transmits the local device text transcript to cloud system 120. According to embodiments, administration module 202 of each communication device 110 accesses the local device text transcript stored in local device text transcript data 216 of communication device 110. Administration module 202 of each communication device 110 transmits the local device text transcript to transmission module 302 of cloud system 120, using network 130 and communication links 140-142. According to embodiments, administration module 202 may transmit the local device text transcript substantially in real time, once every second, once every two seconds, or at any other interval of time. Transmission module 302 of cloud system 120 receives local device text transcripts from each communication device 110 participating in the teleconference space, and stores each local device text transcript separately in local device text transcript data 310 of cloud system 120 database 124.

At action 410, cloud system 120 merging module 304 accesses the local device text transcripts stored in local device text transcript data 310, and merges them into a single master text transcript. Merging module 304 stores the master text transcript in master text transcript data 312 of database 124. According to embodiments, merging module 304 may use a majority consensus mechanism to merge the local device text transcripts into the single master text transcript. In other embodiments, merging module 304 may use any consensus mechanism to merge the local device text transcripts into the master text transcript, and may perform the merging actions described above substantially in real time, once a second, once every two second, or at any other interval of time.

At action 412, cloud system 120 transmits the master text transcript to each communication device 110 participating in the teleconference space. Cloud system 120 transmission module 302 accesses the master text transcript stored in cloud system 120 master text transcript data 312, and transmits the master text transcript to the administration modules 202 of each communication device 110 participating in the teleconference space. Transmission module 302 may access and transmit the master text transcript substantially in real time, once every second, once every two seconds, or at any other interval of time. Upon receiving the master text transcript from transmission module 302, administration module 202 of each communication device 110 stores the master text transcript in master text transcript data 220 of communication device 110 memory 114. According to embodiments, graphical user interface module 208 of each communication device 110 accesses master text transcript data 220, and generates transcript view 602, illustrated by FIG. 6, which communication device 110 displays on the audiovisual display. Each communication device 110 may display either teleconference view 502 or transcript view 602 on the audiovisual display, and may permit switching back and forth between teleconference view 502 and transcript view 602, independently of other communication devices 110 participating in the teleconference space.

Teleconference system 100 terminates method 400 when communication devices 110 disconnect from the teleconference space. According to embodiments, cloud system 120 may store one or more master text transcripts in master text transcript data 312. At a later time, one or more communication devices 110 may connect to cloud system 120 using network 130 and communication links 140-142, and may access the one or more master text transcripts stored in master text transcript data 312.

In order to illustrate the operation of generating an audio-to-text transcript in a teleconference space comprising multiple communication devices 110, an example is now given. In the following example, exemplary teleconference system 100 comprises four communication devices 110, cloud system 120, and network 130 and communication links 140-142 connecting communication devices 110 and cloud system 120 to one another. Although a particular number of communication devices 110, cloud systems 120, networks 130, and communication links 140-142 are described, embodiments contemplate any number of communication devices 110, cloud systems 120, networks 130, or communication links 140-142, according to particular needs.

Continuing the example, each of the four exemplary communication devices 110 comprises a computer. Each computer comprises an audiovisual recording device (comprising a camera and microphone), an audiovisual display (comprising an electronic display screen and one or more speakers), and an input device (comprising a keyboard). In addition, in this example a single user is associated with each computer; in other embodiments, any number of users may be associated with any number of communication devices 110, according to particular needs.

Continuing the example, at action 402, communication device 110 computers generate a teleconference space. Administration module 202 of each computer transmits communication devices data 210, which identifies each computer with a unique communication device 110 ID, and each user associated with each computer with a particular user ID, to the administration modules 202 of the three other computers, and to cloud system 120, using network 130 and communication links 140-142. Administration module 202 of each computer stores, in communication devices data 210 of the computer, communication device 110 ID and user ID of the three other computers participating in the teleconference space.

Continuing the example, at action 404, each computer transmits visual data and audio data to the other computers participating in the teleconference space, and to cloud system 120, using network 130 and communication links 140-142. In other embodiments, each participating communication device 110 may transmit visual data, audio data, or a combination of visual and audio data, to other communication devices 110 participating in the teleconference space. Audiovisual recording module 204 of each computer activates the computer's associated audiovisual recording device, and records audiovisual data, comprising visual data and audio data, of the user associated with the computer. Audiovisual recording module 204 of each computer stores the visual data of the user associated with the computer in local device visual data 212 of the computer memory 114, and stores the audio data of the user associated with the computer in local device audio data 214. Administration module 202 of each computer accesses the visual data stored in local device visual data 212 of the computer, and the audio data stored in local device audio data 214 of the computer, and transmits the visual data and the audio data to each of the other computers participating in the teleconference space.

Continuing the example, administration module 202 of each computer receives the inbound visual data and the inbound audio data transmitted by the other computers participating in the teleconference space. Administration module 202 of each computer associates each of the inbound visual data and audio data transmissions with the particular computer that transmitted each particular visual and audio data transmission, and stores this identification and association information in communication devices data 210 of the computer memory 114. Administration module 202 of each computer stores the inbound visual data and audio data in inbound audiovisual data 218 of the computer memory 114. Graphical user interface module 208 of each computer accesses local device visual data 212 of the computer, local device audio data 214 of the computer, and inbound audiovisual data 218 of the computer, and generates teleconference view 502 that the computer displays on the audiovisual display.

FIG. 5 illustrates teleconference view 502, according to an embodiment.

Continuing the example, teleconference view 502 displays teleconference window 504 and participant panel 506. Although teleconference window 504 and participant panel 506 are shown and described in a particular configuration, embodiments contemplate teleconference windows 504 and/or participant panels 506 of various configurations and placements, according to particular needs.

Teleconference window 504, occupying a large area of the central portion of teleconference view 502 illustrated in FIG. 5, displays the visual data of one or more computers participating in the teleconference space. Although teleconference window 504 is shown and described as occupying the center portion of teleconference view 502, embodiments contemplate teleconference view 502 displaying teleconference window 504 in any configuration. In the embodiment illustrated in FIG. 5 and described in the continuing example, graphical user interface module 208 of each computer accesses local device visual data 212 and inbound audiovisual data 218, and continuously displays the visual data of all computers participating in the teleconference space. In other embodiments, graphical user interface module 208 may select any visual data or any combination of visual data to display in teleconference window 504 of teleconference view 502, including, for example, displaying the video data transmitted by the computer associated with whichever user is currently speaking. Although a particular configuration of teleconference window 504 is shown and described, embodiments contemplate teleconference views 502 displaying visual components and/or teleconference windows 504 in any configuration, according to particular needs.

According to embodiments and continuing the example, participant panel 506 on the right side of teleconference view 502 illustrated in FIG. 5 displays a visual representation of the computers currently participating in the teleconference space. Although participant panel 506 is shown and described as occupying the right side of teleconference view 502, embodiments contemplate teleconference view 502 displaying participant panel 506 in any configuration. According to embodiments, participant panel 506 may identify teleconference space participants by the names of the users associated with the other computers, or by identifying the computers themselves (such as, for example, "Acer One"). In an embodiment, administration module 202 may assign names to other communication devices 110 displayed in participant panel 506 using information contained in the communication devices data 210. Continuing the example, participant panel 506 of exemplary teleconference view 502 lists the four participating computers. Although a specific participant panel 506 configuration is shown and described, embodiments contemplate teleconference views 502 displaying participant panels 506 in any configuration, according to particular needs.

Continuing the example, at action 406, each computer generates a local device text transcript of the audio data stored in local device audio data 214 of the computer. Transcription module 206 of each computer accesses local device audio data 214 of that computer, and transcribes the audio data stored in local device audio data 214 into a local device text transcript. Transcription module 206 of each computer, having generated a local device transcript of the computer's audio data, stores the local device text transcript in local device text transcript data 216 of the computer memory 114. In this example, transcription module 206 of each computer accesses local device audio data 214 of that computer, transcribes the audio data stored therein, and updates the local device text transcript stored in local device text transcript data 216, once every second. In other embodiments, transcription module 206 may update the local device text transcript substantially in real time, once every two seconds, or at any other interval of time.

Continuing the example, at action 408, each of the computers participating in the teleconference space transmits the local device text transcript to cloud system 120. More specifically, administration module 202 of each computer accesses the local device text transcript stored in local device text transcript data 216 of the computer. Administration module 202 of each computer transmits the computer's local device text transcript to transmission module 302 of cloud system 120, using network 130 and communication links 140-142. In this example, administration module 202 of each computer accesses the local device text transcript stored in local device text transcript data 216 of the computer memory 114, and transmits the local device text transcript to cloud system 120 transmission module 302 once every second. In other embodiments, administration module 202 may transmit the local device text transcript substantially in real time, once every two seconds, or at any other interval of time.

Transmission module 302 of cloud system 120 receives local device text transcripts from each of the four computers participating in the teleconference space, and stores each local device text transcript separately in local device text transcript data 310 of cloud system 120 database 124, once every second. In other embodiments, administration module 202 may store local device text transcripts in local device text transcript data 310 substantially in real time, once every two seconds, or at any other interval of time.

Continuing the example, at action 410, cloud system 120 merging module 304 accesses the local device text transcripts stored in local device text transcript data 310, and merges them into a single master text transcript. Merging module 304 stores the master text transcript in master text transcript data 312 of database 124. Continuing with the example, merging module 304 uses a majority consensus mechanism to merge the local device text transcripts into the single master text transcript. That is, merging module 304 accesses the local device text transcripts stored in local device text transcript data 310, merges the local device text transcripts into the master text transcript, and stores the master text transcript in master text transcript data 312, once every second. In other embodiments, merging module 304 may use any consensus mechanism to merge the local device text transcripts into the master text transcript, and may perform the merging actions described above substantially in real time, once every two second, or at any other interval of time.

Continuing the example, at action 412, cloud system 120 transmits the master text transcript to each of the computers participating in the teleconference space. Cloud system 120 transmission module 302 accesses the master text transcript stored in cloud system 120 master text transcript data 312, and transmits the master text transcript to the administration modules 202 of each of the computers participating in the teleconference space. In this example, transmission module 302 accesses the master text transcript stored in master text transcript data 312 and transmits the master text transcript once every second; in other embodiments, transmission module 302 may access and transmit the master text transcript substantially in real time, once every two seconds, or at any other interval of time. Upon receiving the master text transcript from transmission module 302, administration module 202 of each computer stores the master text transcript in master text transcript data 220 of computer memory 114. Graphical user interface module 208 of each computer accesses master text transcript data 220 of the computer, and generates transcript view 602 which the computer displays on the audiovisual display. Each computer may display either teleconference view 502 or transcript view 602 on an audiovisual display, and may permit switching back and forth between teleconference view 502 and transcript view 602, independently of other computers participating in the teleconference space.

FIG. 6 illustrates transcript view 602, according to an embodiment. In an embodiment, transcript view 602 comprises transcript column 604 and participant panel 506. Although transcript column 604 and participant panel 506 are shown and described in a particular configuration, embodiments contemplate transcript columns 604 and/or participant panels 506 of various configurations and placements, according to particular needs.

According to embodiments, transcript column 604 occupies the majority of the center of transcript view 602. Although transcript column 604 is shown and described as occupying the center portion of transcript view 602, embodiments contemplate transcript view 602 displaying transcript column 604 in any configuration. Graphical user interface module 208 may access master text transcript data 220, and may display the text transcription stored in master text transcript data 220 as individual messages in transcript column 604. In one embodiment, graphical user interface module 208 may display each sentence stored in master text transcript data 220 as an individual message. In other embodiments, graphical user interface module 208 may display master text transcript data 220 on transcript column 604 in any format, such as, for example, by associating multiple sentences spoken by a particular user into a single transcript column 604 message.

Continuing with the example, transcript column 604 displays the master text transcript as the computers participate in the teleconference space. In this embodiment, graphical user interface module 208 accesses the master text transcript stored in master text transcript data 220, and updates transcript column 604 with the most up-to-date text transcription stored in master text transcript data 220, once every second. In other embodiments, graphical user interface module 208 may update transcript column 604 substantially in real time, once every two seconds, or at any other interval of time.

According to embodiments, participant panel 506 shown on the right side of transcript view 602 of FIG. 6 displays a visual representation of communication devices 110 currently participating in the teleconference space. Transcript view 602 may identify participating communication devices 110 by the names of the users associated with communication devices 110 (such as "Jean-Baptiste"), or by identifying communication devices 110 themselves (such as "Acer One," and the like). In an embodiment, administration module 202 may assign names to other communication devices 110 displayed in participant panel 506 using information contained in the communication devices data 210. Transcript view 602 may display the names of communication devices 110 participating in the teleconference space under, or in association with, each individual message displayed in transcript view 602. Concluding the example, teleconference system 100 terminates method 400 when the computers disconnect from the teleconference space.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
two or more communication devices, each of the two or more communication devices configured to store recorded local device audio data, receive inbound audio and visual data from at least one other communication device, generate a local device transcript from the recorded local device audio data and generate a selectable display of a teleconference view or a transcript view; and
a computer coupled with a database and comprising a processor and memory, the computer configured to:
generate a teleconference space;
transmit requests to join the teleconference space to the two or more communication devices;
store in the computer memory, identification information for each of the two or more communication devices;
receive the local device transcript from each of the two or more communication devices, wherein the local device transcript of each communication device is associated with one or more communication device users;
merge the local device transcript from each of the two or more communication devices into a master audio transcript;
transmit the master audio transcript to each of the two or more communication devices; and
display, in response to a selection of the selectable display, the transcript view of the master audio transcript from each of the two or more telecommunication devices or the teleconference view of the visual data.

2. The system of claim 1, wherein the computer is further configured to:
  use a predictive algorithm to parse the local device audio data into discrete words.

3. The system of claim 2, wherein the computer is further configured to:
  parse the local device audio data using vocal pitch data stored in the local device audio data, from two or more communication device users associated with at least one of the two or more communication devices.

4. The system of claim 3, wherein the computer is further configured to:
  using a consensus mechanism, rectify discrepancies between the local device transcript from each of the two or more communication devices; and
  merge the local device transcript from each of the two or more communication devices into the master audio transcript.

5. The system of claim 4, wherein the consensus mechanism comprises the computer selecting, for the master audio transcript, dialogue that is present in the majority of the local device transcripts of the two or more communication devices.

6. The system of claim 5, wherein the computer is configured to store the local device transcript transmitted to the computer by each of the two or more communication devices, merge the local device transcript from each of the two or more communication devices into a master audio transcript, and transmit the master audio transcript to each of the two or more communication devices substantially in real time.

7. The system of claim 1, wherein each of the two or more communication devices comprises a communication device selected from the list of:
  a computer;
  a tablet computer; and
  a smartphone.

8. A computer-implemented method, comprising:
  configuring each of two or more communication devices to store recorded local device audio data, receive inbound audio and visual data from at least one other communication device, generate a local device transcript from the recorded local device audio data and generate a selectable display of a transcript view or a teleconference view;
  generating, using a computer coupled with a database and comprising a processor and memory, a teleconference space in which the two or more communication devices participate;
  transmitting requests to join the teleconference space to the two or more communication devices;
  storing, by each of the two or more communication devices, recorded local device audio data;
  receiving, by each of the two or more communication devices, inbound audio data from at least one other communication device;
  generating, by each of the two or more communication devices, a local device transcript from the recorded local device audio data;
  storing, in the computer memory, identification information for each of the two or more communication devices;
  storing the local device transcript transmitted to the computer by each of the two or more communication devices, wherein the local device transcript of each communication device is associated with one or more communication device users;
  merging the local device transcript from each of the two or more communication devices into a master audio transcript;
  transmitting the master audio transcript to each of the two or more communication devices; and
  displaying, in response to a selection of the selectable display, the transcript view of the master audio transcript from each of the two or more telecommunication devices or the teleconference view of the visual data.

9. The computer-implemented method of claim 8, further comprising using a predictive algorithm to parse the local device audio data into discrete words.

10. The computer-implemented method of claim 9, further comprising using vocal pitch data, stored in the local device audio data, to parse the local device audio data from two or more communication device users associated with at least one of the two or more communication devices.

11. The computer-implemented method of claim 10, further comprising using a consensus mechanism to rectify discrepancies between the local device transcript from each of the two or more communication devices and merge the local device transcript from each of the two or more communication devices into the master audio transcript.

12. The computer-implemented method of claim 11, wherein the consensus mechanism comprises selecting, for the master audio transcript, dialogue that is present in the majority of the local device transcript of the two or more communication devices.

13. The computer-implemented method of claim 12, further comprising storing the local device transcript transmitted to the computer by each of the two or more communication devices, merging the local device transcript from each of the two or more communication devices into the master audio transcript, and transmitting the master audio transcript to each of the two or more communication devices substantially in real time.

14. The computer-implemented method of claim 8, wherein each of the two or more communication devices comprises a communication device selected from the list of:
  a computer;
  a tablet computer; and
  a smartphone.

15. A non-transitory computer-readable storage medium embodied with software, the software when executed:
  configures each of two or more communication devices to store recorded local device audio data, receive inbound audio and visual data from at least one other communication device, generate a local device transcript from the recorded local device audio data and generate a selectable display of a transcript view or a teleconference view;
  generates, using a computer coupled with a database and comprising a processor and memory, a teleconference space in which the two or more communication devices participate;
  transmits requests to join the teleconference space to the two or more communication devices;
  stores, by each of the two or more communication devices, recorded local device audio data;
  receives, by each of the two or more communication devices, inbound audio data from at least one other communication device;
  generates, by each of the two or more communication devices, a local device transcript from the recorded local device audio data;

stores, in the computer memory, identification information for each of the two or more communication devices;

stores the local device transcript transmitted to the computer by each of the two or more communication devices, wherein the local device transcript of each communication device is associated with one or more communication device users;

merges the local device transcript from each of the two or more communication devices into a master audio transcript;

transmits the master audio transcript to each of the two or more communication devices; and displays, in response to a selection of the selectable display, the transcript view of the master audio transcript from each of the two or more telecommunication devices or the teleconference view of the visual data.

16. The non-transitory computer-readable storage medium of claim 15, wherein the software when executed further:

uses a predictive algorithm to parse the local device audio data into discrete words.

17. The non-transitory computer-readable storage medium of claim 16, wherein the software when executed further: uses vocal pitch data, stored in the local device audio data, to parse the local device audio data from two or more communication device users associated with at least one of the two or more communication devices.

18. The non-transitory computer-readable storage medium of claim 17, wherein the software when executed further: uses a consensus mechanism to rectify discrepancies between the local device transcript from each of the two or more communication devices and merge the local device transcript from each of the two or more communication devices into the master audio transcript.

19. The non-transitory computer-readable storage medium of claim 18, wherein the consensus mechanism comprises the software when executed selecting, for the master audio transcript, dialogue that is present in the majority of the local device transcripts of the two or more communication devices.

20. The non-transitory computer-readable storage medium of claim 19, wherein the software when executed is further configured to store the local device transcript transmitted to the computer by each of the two or more communication devices, merge the local device transcript from each of the two or more communication devices into the master audio transcript, and transmit the master audio transcript to each of the two or more communication devices substantially in real time.

* * * * *

UNITED STATES PATENT AND TRADEMARK OFFICE
CERTIFICATE OF CORRECTION

| | |
|---|---|
| PATENT NO. | : 11,328,730 B2 |
| APPLICATION NO. | : 16/861929 |
| DATED | : May 10, 2022 |
| INVENTOR(S) | : Tomas Gorny et al. |

It is certified that error appears in the above-identified patent and that said Letters Patent is hereby corrected as shown below:

In the Specification

Column 1 Lines 30-43 should read:
Teleconference systems may utilize communication networks, including but not limited to the internet, to connect communication devices such as computers, tablet computers, and/or smartphones. Teleconference systems may permit communication devices to share visual imagery and audio data associated with a speaking user with other communication devices. However, multi-device and multi-user teleconferences face several challenges in automatically generating and storing transcripts of the teleconference. By way of example and not of limitation, teleconference systems may be unable to rectify discrepancies in transcripts generated by separate communication devices, and may also fail to make accessible a master text transcript of the teleconference quickly and easily.

Column 9 Lines 28-42 should read:
According to embodiments, master text transcript data 220 of communication device 110 memory 114 stores data pertaining to the master text transcript. Cloud system 120 generates the master text transcript, and transmits the master text transcript to administration module 202 of communication device 110 using network 130 and communication links 140-142. Administration module 202 stores the master text transcript in master text transcript data 220 of communication device 110 memory 114. According to embodiments, administration module 202 may store the master text transcript as a plain text file, an encrypted file, or in any other format capable of storing a text file comprising transcribed audio data. In an embodiment, graphical user interface module 208 accesses master text transcript data 220 and generates transcript view 602, illustrated in FIGURE 6.

Signed and Sealed this
Twenty-first Day of February, 2023

Katherine Kelly Vidal
*Director of the United States Patent and Trademark Office*